United States Patent Office 2,789,143
Patented Apr. 16, 1957

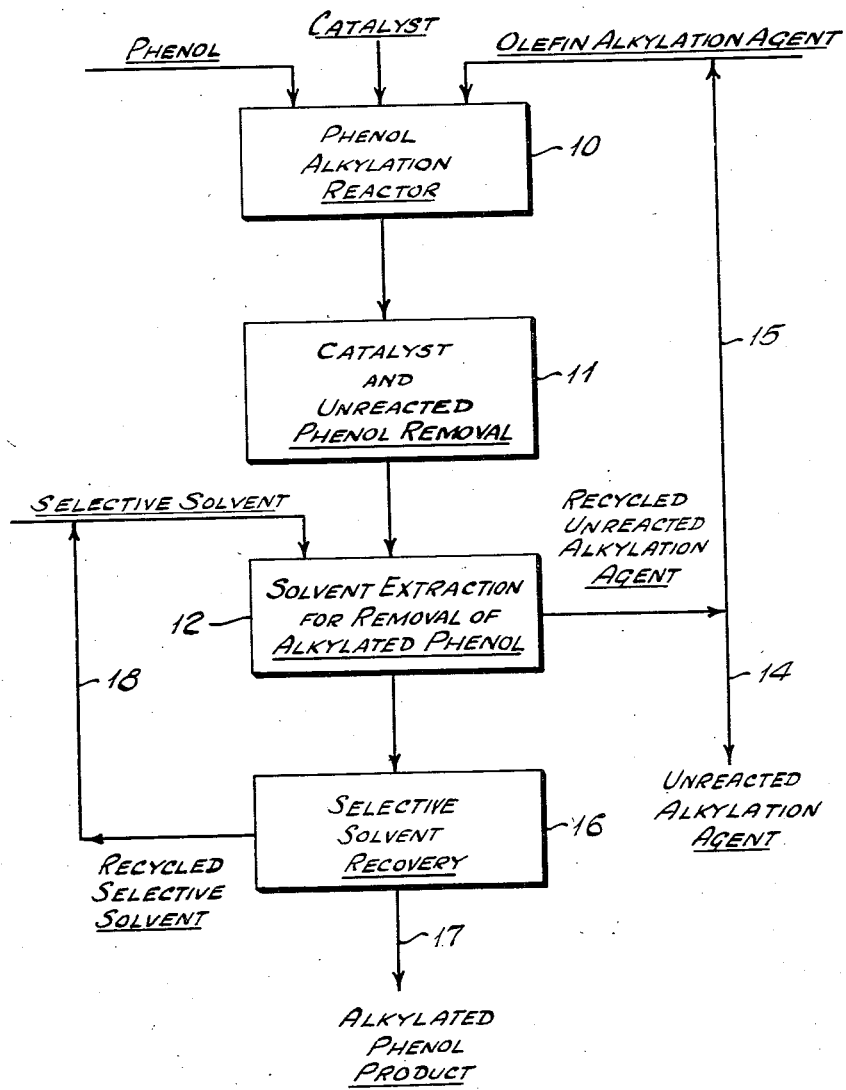

2,789,143

MANUFACTURE OF ALKYL PHENOLS

George B. Arnold, Fishkill, and Herman D. Kluge, Wappingers Falls, N. Y., assignors to The Texas Company, New York, N. Y., a corporation of Delaware Application August 17, 1954, Serial No. 450,394

16 Claims. (Cl. 260—624)

This invention relates to alkylated phenols. More particularly this invention relates to an improved process for the manufacture of alkylated phenols. In one of its embodiments the practice of this invention is particularly applicable to the manufacture of substantially pure high molecular weight alkyl phenols.

Alkyl phenols, particularly high molecular weight alkyl phenols, are valuable chemicals. Alkyl phenols are useful per se, and as chemical intermediates, solvents and as lubricating oil additives, particularly in the form of their corresponding alkaline earth metal salts or zinc salts, e. g., magnesium alkyl phenolates and zinc alkyl phenolates.

Heretofore the preparation of alkyl phenols, particularly high molecular weight alkyl phenols, has been difficult, time consuming and expensive, especially when a substantially pure alkylated phenol product is desired. For example, heretofore in order to prepare a high molecular weight alkyl phenol it has been the practice to employ a substantially pure olefin fraction, such as an olefin polymer derived by fractionally distilling a wide boiling mixture of olefin polymers. After separation of the narrow boiling olefin polymer fractions phenol is separately alkylated therewith. Each resulting alkylated phenol product is then treated and fractionated to remove any unreacted phenol and olenfin polymer. Separate frictionations are ncessary for the removal of unreacted olefin polymer because of the close boiling range of the resulting alkylated phenols and the olefin polymers present in the original olefin mixture. It is apparent that the above operations are time consuming, difficult and expensive. Furthermore, it is apparent that wide boiling, readily available commercial mixtures of olefin polymers cannot be directly used for the manufacture of substantially pure alkylated phenols because of the fact that the resulting reaction mixture would contain the desired alkyl phenol in admixture with unreacted olefin polymer having substantially the same boiling range with the result that separation and recovery of all the alkylated phenol as a pure product by straightforward distillation and fractionation is substantially impossible.

Accordingly, it is an object of this invention to provide an improved process for the manufacture, separation and recovery of alkylated phenols.

It is another object of this invention to provide a process for the manufacture of alkylated phenols whereby an alkylated phenol product substantially free of unreacted olefin is readily obtainable.

Still another object of this invention is to provide a method for the manufacture of alkylated phenol wherein there is employed as the alkylating agent a wide boiling mixture of olefins and wherein the resulting reaction mixture is treated and handled in such a manner to yield an alkylated phenol product substantially free of unreated olefin.

Still another object of this invention is to provide a process for the manufacture of alkyl phenols whereby improved yields of a substantially pure alkyl phenol product are obtainable.

These and other objects of this invention and how they are accomplished will be readily apparent in the light of accompanying disclosure and drawing which sets forth certain of the process steps in accordance with our invention.

In accordance with our invention, we have provided an improved process for the manufacture of alkylated phenol which comprises subjecting a mixture containing a phenol and an olefin in the presence of a suitable alkylation catalyst to reaction to form a reaction admixture containing resulting alkylated phenol and unreacted olefin, contacting said reaction mixture with a selective solvent for said alkylated phenol to form a resulting extract phase containing said alkylated phenol dissolved in said selective solvent and recovering from said extract phase the desired alkylated phenol product. When the above-indicated operations in accordance with our invention are carried out there is produced an alkylated phenol product having an increased proportion of alkylated phenols relative to the proportion of alkylated phenols present in said reaction admixture. Stated in other words, in accordance with our invention there is recovered an alkylated phenol product having a reduced proportion of unreacted olefin with respect to said reaction admixture.

Referring now in greater detail to the accompanying drawing there is introduced into the phenol alkylation reactor suitable molar quantities of the phenol to be alkylated, of the olefin alkylating agent and a suitable alkylation catalyst therefor. Phenols which can be suitably alkylated and recovered in the form of the desired alkylated phenol product include such materials as phenol or a mixture of phenol together with the various cresols. Other suitable phenols include the low molecular weight ($C_1$–$C_3$ alkyl substituted) phenols such as ethylphenol, propylphenol, the xylenols and the like.

Suitable olefinic alkylating agents for use in the practice of our invention include such olefinic hydrocarbons as the hexenes, heptenes, octenes, nonenes, decenes, the wax olefins such as may be obtained by the thermal decomposition of waxy hydrocarbons, such as wax olefins and mixtures thereof in the range $C_{12}$–$C_{30}$ and higher. Particularly suitable olefinic alkylating agents in the practice of our invention include the various olefin polymers and mixtures thereof, such as the polypropylenes, polybutylenes and polyisobutylenes and/or their co-polymers, and/or the olefin co-polymers such as a co-polymer of propylene and isobutylene or a co-polymer of butylene and isobutylene and the like. A suitable alkylating agent is a wide boiling mixture of olefin polymers such as a polypropylene and polyisobutylene fraction containing corresponding polypropylenes and polyisobutylenes having a molecular weight in the range 150–600, especially in the range 250–450, e. g., a mixture containing olefin polymers having a number of carbon atoms per molecule in the range $C_8$–$C_{40}$ and higher, preferably $C_{10}$–$C_{25}$.

Suitable alkylation catalyst which may be employed in the practice of our invention include any of the alkylation catalysts known to be suitable for the alkylation of a phenol, such as alkylation of phenol by means of an olefinic hydrocarbon. Typical suitable alkylation catalyst include boron fluoride ($BF_3$), a catalyst complex obtained by reacting aluminum chloride ($AlCl_3$) and concentrated sulfuric acid ($H_2SO_4$), which complex may be represented by the chemical formula $AlCl_2.HSO_4$. Another suitable alkylation catalyst is zinc chloride. Other suitable alkylation catalysts are, of course, known and are suitable in the practice of this invention.

The alkylation reactor containing the reactants phenol, olefinic hydrocarbon and catalyst, is maintained at a suitable temperature and pressure known to be conducive to the desired alkylation reaction. For example, depending upon the particular catalyst and/or olefinic alkylating agent employed, the reactor (alkylation reaction) is maintained at a temperature in the range 30–120° C. and higher, the pressure maintained within the reactor being sufficient to maintain substantially all the reactants in the liquid stage. In effect the reactor temperature and pressure during the alkylation reaction are maintained at any suitable and convenient level for carrying out the desired alkylation reaction.

After the alkylation reaction has progressed the desired extent the resulting reaction admixture, now containing alkyl phenol, unreacted phenol, unreacted olefinic alkylating agent and catalyst, is suitably treated, as indicated at station 11 of the accompanying drawing, such as by neutralization, solvent extraction, e. g., water washing and/or fractional distillation etc. for the removal of the alkylation catalyst and the unreacted phenol contained therein. There remains in the resulting reaction mixture, after the removal of the catalyst and the unreacted phenol, the desired alkylated phenol together with the unreacted olefinic alkylating agent.

This resulting reaction mixture is then subjected, in accordance with the practice of this invention, to a liquid-liquid or liquid-vapor solvent extraction operation, indicated by station 12 of the drawing, for the removal of the desired alkylated phenol product contained therein. The solvent employed in this solvent extraction step is a selective solvent for the alkylated phenols contained in the reaction mixture. Selective solvents suitable for use in the practice of our invention include the various well known selective solvents for aromatic compounds. Particularly suitable solvents for the recovery of alkylated phenol by liquid-liquid solvent extraction are nitromethane, methanol, mixtures of methanol and nitromethane, aqueous methanol, e. g., aqueous methanol solutions containing 85–99% methanol, the various organic nitriles such as acetonitrile, furfural, the various glycols such as propylene glycol, diethylene glycol, certain low molecular weight alcohols such as ethyl, isopropyl and propyl alcohol, acetone, benzyl alcohol, mixtures of the various nitroalkanes such as a 50–50 mixture of nitroethane and nitromethane, crotonaldehyde, glacial acetic acid, nitrobenzene, the various low molecular weight nitroalkanes such as nitroethane and nitropropane, and mixtures thereof, e. g., 50–50 mixture of nitroethane and nitromethane, and mixtures of the above together with minor amounts of water, phenol, B, B'-dichloroethyl ether (Chlorex), aniline, acetic anhydride, phenol and mixtures of phenols such as a liquid mixture of phenol and cresols commonly known as "Selecto." Particularly suitable selective solvents for the practice of our invention are nitromethane, methanol, aqueous methanol. In accordance with one aspect of this invention a high boiling, high molecular weight alkylated phenol fraction recovered from the resulting alkylated phenol product is particularly suitable for the recovery of alkylated phenol from the resulting reaction mixture containing alkylated phenol and unreacted olefin in a liquid-vapor solvent extraction or extractive distillation operation wherein said high boiling, high molecular weight alkyl phenol fraction in a liquid phase is passed in direct countercurrent contact with the vaporized reaction mixture to be fractionated. Other suitable high boiling selective solvents for the recovery of the unreacted olefin might also be used as the solvent in the extractive distillation operation.

The solvent extraction step for the recovery of the alkylated phenol from the reaction mixture may be carried out by continuous direct liquid-liquid countercurrent extraction or by multiple batch liquid-liquid concurrent or countercurrent extraction. The extraction operation may be carried out at any suitable temperature and pressure necessary or convenient for maintaining the selective solvent employed and the reaction mixture undergoing fractionation in the desired phase. In general, temperature and pressure of the solvent extraction operation should be adjusted so as to continuously maintain substantially all of the selective solvent and the reaction mixture undergoing separation in the liquid phase. Of course, when the reaction mixture is undergoing fractionation for the removal of its alkyl phenol content by extractive distillation, the reaction mixture is maintained in the gaseous or vapor phase whereas at the same time the selective solvent is maintained in the liquid phase.

After the above-described solvent extraction step there remains a liquid extract phase comprising principally selective solvent and alkylated phenol dissolved therein and a separate raffinate phase containing substantially all of the unreacted olefinic alkylating agent. If desired the unreacted olefinic alkylating agent is removed from the system via line 14 as indicated in the drawing or recycled to the alkylation reactor via line 15.

The extract phase containing the selective solvent and the desired alkylated phenol dissolved therein is separately treated, as indicated at station 16 of the drawing, for the separation and recovery of the alkylated phenols therein. Depending upon the particular selective solvent employed, various methods and techniques for the fractionation of the extract phase to recover its alkylated phenol content may be employed. Usually, and generally most conveniently, the extract phase is subjected to fractional distillation for the separation and recovery of the alkyl phenol constituents therein. The separated alkylated phenol is recovered and withdrawn from the system via line 17 as product. If desired, a high molecular weight, high boiling fraction of the fractionated alkylated phenol product, usually recovered as a bottoms alkylated phenol product, is recycled via line 18 to an extractive distillation operation as a selective solvent for the recovery of the alkylated phenol from the reaction mixture.

The following examples and data are illustrative of the practice of this invention and set forth methods for the alkylation of a phenol such as phenol by means of an olefinic hydrocarbon such as a mixture of high molecular weight olefin polymers obtained by the polymerization of propylene or isobutylene.

EXAMPLE 1

Two batches of mixed catalyst were prepared by reacting in each case—266 grams of $AlCl_3$ and 111 grams of concentrated $H_2SO_4$. The acid was gradually added to the anhydrous $AlCl_3$ with stirring. The mixture was heated until a temperature of 60° C. was reached, stirring being continued throughout. At 60° C., the container was placed in a pan of water and stirring continued until temperature decreased and fumes were no longer evolved. The resulting product was then ground.

Into each of two 12-liter flasks was charged 1555 grams of phenol. The flasks were heated to 60° C. and 310.5 grams of mixed catalyst was added to each with continuous stirring. The mixtures were heated to 80° C. and 1552–1556 grams of propylene polymer was added slowly to each with continuous stirring. The resulting mixtures were then stirred for 24 hours at 80° C. The mixtures were then allowed to cool and 3½ liters of dilute hydrochloric acid solution (1 vol. conc. HCl:10 vols. $H_2O$) were added slowly with stirring. The acidified material was poured into two separatory funnels and the acid layer drawn off. The hydrocarbon layers were water washed until neutral to Congo red paper.

The water washed neutral material was charged into two 12-liter flasks equipped with water trap and condenser. Nine hundred cc. of alcohol and 650 grams of sodium hydroxide dissolved in 650 cc. water were added to each flask. The mixtures were then refluxed for 4 hours and 1540 cc. of conc. HCl were added to each flask. The resulting mixtures were then water washed twice and then 1500 cc. of diethyl ether were added to each and the water washing continued until the wash water was neutral to Congo red paper. The resulting material was stripped under diminished pressure from a Claisen type flask with heated lead. The above-derived resulting reaction mixture now substantially free of catalyst and unreacted phenol comprised principally a mixture of alkylated phenols together with unreacted olefin polymers having substantially the same boiling points as said alkylated phenols.

EXAMPLE 2

Twenty-five hundred forty-one grams of phenol were placed in a 12-liter flash equipped with stirrer, thermometer, dropping funnel and bubbling tube. The phenol was heated to 55° C. and 45 grams of boron trifluoride ($BF_3$) were bubbled in with stirring, maintaining the solution temperature at 50–60° C. during $BF_3$ addition. While still maintaining the mixture temperature at 50–60° C., 5000 grams of olefin polymer (polybutenes having a molecular weight in the range 360–380) were slowly added by means of a dropping funnel. The solution temperature was then raised to 105–110° C. and maintained there for 1½ hours. Nine hundred ml. of saturated aqueous sodium bicarbonate solution at room temperature were then added. The resulting solution was stirred for 15 minutes at 100° C. and then washed twice with half its volume of 5 percent caustic (NaOH) solution. This was followed by two washings with 1:10 HCl to water solution. The material was then water washed until neutral to Congo red paper. The material was dried by benzene refluxing, stripped under water aspirator vacuum, and then at 5 mm. Hg and 120° C. for 1 hour to remove solvent. The resulting material was fractionated using a Claisen type apparatus and there was recovered a resulting reaction admixture comprising principally alkylated phenols and unreacted olefin polymers having substantially the same boiling points as said alkylated phenols.

Reaction mixtures containing essentially high molecular weight alkylated phenols and unreacted olefin polymers having substantially the same boiling point as said alkylated phenol, such as are derived in the manner indicated in Examples 1 and 2 hereinabove were subjected to solvent extraction for the recovery of the alkylated phenols in accordance with this invention. The solvent extraction operations employing various solvents were carried out by a batch extraction at room temperature (in the range 20–35° C.) using a 100 percent solvent dosage based on the alkyl phenol content of the reaction mixture being extracted. Additional solvent extraction operations were carried out in a conventional continuous counter-current liquid-liquid manner employing a glass tube column 2¼" in diameter and 7½' tall. Situated 15" from the bottom of this column was a 5½' packed section of ¼" saddles to promote liquid-liquid contact. The usual pumps, valves, connecting lines, etc. for the various materials being handled were provided in order to operate the solvent extraction operation in a continuous manner. The results of the batch solvent extraction operations are set forth in Table No. 1.

Table No. 1

SUMMARY DATA ON THE SOLVENT EXTRACTION OF CRUDE ALKYLPHENOL

| Run No. | Solvent | Charge Percent AP[1] | Charge Ratio[2] | Extract Percent AP | Extract Ratio | Raffinate Percent AP | Raffinate Ratio |
|---|---|---|---|---|---|---|---|
| 1 | Nitromethane | 16 | 1.0 | 90 | 22.6 | 18 | 0.176 |
| 2 | 10% Methanol in Nitromethane | 32 | 1.0 | 86 | 44.0 | 41 | 0.51 |
| 3 | 25% Methanol in Nitromethane | 32 | 1.0 | 79 | 15.0 | 19 | 0.090 |
| 4 | Methanol | 16 | 1.0 | 70 | 16.8 | 16 | 0.179 |
| 5 | 50% Methanol in Nitromethane | 32 | 1.0 | 65 | 9.7 | 10 | 0.296 |
| 6 | Methanol | 14 | 1.0 | 62 | 14.2 | 10 | 0.081 |
| 7 | Acetonitrile | 16 | 1.0 | 57 | 4.1 | 14 | 0.141 |
| 8 | Furfural | 14 | 2.0 | 55 | 7.0 | 4 | 0.120 |
| 9 | Propylene Glycol | 16 | 1.0 | 55 | 19.7 | 17 | 0.177 |
| 10 | Acetic Anhydride | 14 | 2.0 | 53 | 11.8 | 8 | 0.129 |
| 11 | Acetone | 16 | 1.0 | 53 | 1.2 | 16 | 0.238 |
| 12 | Aniline | 14 | 2.0 | 48 | 7.9 | 5 | 0.169 |
| 13 | Benzyl Alcohol | 32 | 1.0 | 46 | 3.5 | 40 | 1.02 |
| 14 | 50% Nitroethane in Nitromethane | 32 | 1.0 | 46 | 10.0 | 29 | 0.46 |
| 15 | Diethylene Glycol | 32 | 1.0 | 45 | 1.2 |  | 0.077 |
| 16 | Nitroethane | 32 | 1.0 | 40 | 3.9 | 23 | 0.22 |
| 17 | Ethanol | 16 | 1.0 | 38 | 3.1 | 16 | 0.278 |
| 18 | Crotonaldehyde | 18 | 1.0 | 38 | 2.2 | 14 | 0.58 |
| 19 | Glacial Acetic Acid | 32 | 1.0 | 38 | 1.1 | 32 | 2.0 |
| 20 | Nitrobenzene | 32 | 1.0 | 34 | 1.4 | 21 | 0.44 |
| 21 | Nitroethane | 16 | 1.0 | 33 | 2.9 | 14 | 0.198 |
| 22 | Nitropropane | 16 | 1.0 | 29 | 0.226 | 25 | 1.6 |
| 23 | Isopropanol | 16 | 1.0 | 26 | 2.7 | 18 | 0.353 |
| 24 | Nitromethane | 34 | 1.0 | 99 | 33.4 | 32 | 0.088 |
| 25 | do | 34 | 1.0 | 100 | 39.4 | 30 | 0.089 |
| 26 | do | 22 | 1.0 | 94 | 68.4 | 19 | 0.073 |
| 27 | do | 69 | 1.0 | 94 | 28.3 | 72 | 0.191 |
| 28 | do | 32 | 1.0 | 86 | 25.6 | 21 | 0.174 |
| 29 | do | 75 | 1.0 | 100 | 8.8 | 81 | 0.214 |
| 30 | do | 11 | 1.0 | 70 | 67.1 | 13 | 0.032 |
| 31 | 93% Methanol | 14 | 1.0 | 62 | 14.2 | 10 | 0.081 |
| 32 | do | 32 | 1.0 | 67 | 9.4 | 21 | 0.218 |
| 33 | do | 51 | 1.0 | 68 | 6.5 | 49 | 0.57 |
| 34 | 95% Methanol | 86 | 1.0 | 98 | 5.8 | 85 | 0.35 |
| 35 | do | 71 | 1.0 | 100 | 19.3 | 69 | 0.094 |
| 36 | do | 65 | 1.0 | 99 | 34.5 | 63 | 0.041 |
| 37 | 98% Methanol | 86 | 1.0 | 90 | 1.6 | 85 | 0.60 |
| 38 | do | 71 | 1.0 | 98 | 8.9 | 70 | 0.10 |
| 39 | do | 65 | 1.0 | 97 | 19.5 | 63 | 0.05 |
| 40 | do | 61 | 1.0 | 92 | 33.1 | 59 | 0.05 |

[1] Percent alkylphenol by Ref. Index.
[2] Ratio (wt.) solvents/alkylphenol.

Nitromethane and methanol were also investigated by continuous countercurrent extraction of alkylated phenols from a reaction mixture containing the same together with unreacted olefin polymers having substantially the same boiling point. In those cases wherein nitromethane was employed as the selective solvent the nitromethane as the continuous phase was flowed downwardly and the mixture containing alkylated phenols flowed upwardly within the extraction column. These extractions were carried out at about room temperature except for slightly heating the charge mixture in order to facilitate pumping. Typical equilibrium data on several extractions employing different solvent dosages are summarized in Table No. 2.

Table No. 2

SUMMARY EQUILIBRIUM DATA ON CONTINUOUS COUNTER-CURRENT SOLVENT EXTRACTION OF ALKYLPHENOL WITH NITROMETHANE

| Run No. | Time of Run, hrs. | Charge, Percent Alkylphenol | Ratio, Solvent: A-phenol | Extract, Percent Alkylphenol | Ratio, Solvent: A-phenol | Raffinate Percent Alkylphenol | Ratio, Solvent: A-phenol |
|---|---|---|---|---|---|---|---|
| 41 | 9 | 81 | 11.8 | 95.5 | 21.1 | 69 | 0.172 |
| 42 | 8 | 81 | 4.7 | 98 | 17.1 | 65 | 0.171 |
| 43 | 35 | 81 | 9.0 | 97 | 21.6 | 69 | 0.102 |

Similar procedures were used to continuously countercurrently extract alkylated phenols with 98% methanol, except in these instances the solvent was charged to the bottom of the extraction column and flowed upwardly. The summarized equilibrium data for these extractions are set forth in Table No. 3.

Table No. 3

SUMMARY EQUILIBRIUM DATA ON CONTINUOUS COUNTER-CURRENT SOLVENT EXTRACTION OF ALKYLPHENOL WITH 98% METHANOL

| Run No. | Time of Run, hrs. | Charge, Percent Alkyl-phenol | Ratio, Solvent: A-phenol | Extract, Percent Alkyl-phenol | Ratio, Solvent: A-phenol | Raffinate Percent Alkyl-phenol | Ratio, Solvent: A-phenol |
|---|---|---|---|---|---|---|---|
| 44 | 8 | 80 | 1.9 | 87 | 3.0 | 65 | 0.156 |
| 45 | 14 | 80 | 2.1 | 89 | 2.7 | 73 | 0.178 |
| 46 | 13 | 80 | 4.0 | 96 | 4.7 | 70 | 0.148 |

It is apparent from the data presented in Table No. 3 that in the case of 98% MeOH as a selective solvent the 4:1 solvent dosage affords the best degree of separation of the alkylated phenols. Accordingly, 98% aqueous methanol compares favorably with nitromethane in the alkylated phenol separation obtained and additionally has the advantage of a somewhat lower solvent dosage requirement.

As will be apparent to those skilled in the art upon reading the accompanying disclosure and claims, many modifications and substitutions are possible in the practice of this invention without departing from the spirit or scope thereof.

We claim:

1. A process for the manufacture of alkylated phenol which comprises subjecting a mixture containing a phenol and an olefin to reaction to form a reaction admixture containing resulting alkylated phenol and unreacted olefin, contacting said reaction admixture with a selective solvent for said alkylated phenol selected from the group consisting of a nitroalkane, a mixture of a nitroalkane and a low molecular weight alcohol and a high boiling alkylated phenol fraction recovered from the alkylated phenol product mentioned below to form an extract phase containing said alkylated phenol dissolved in said selective solvent, recovering said extract phase and removing said selective solvent from said extract phase to produce an alkylated phenol product having a reduced proportion of unreacted olefin with respect to said reaction admixture.

2. A process in accordance with claim 1 wherein said olefin is a mixture of olefin polymers containing olefin polymers having substantially the same boiling point as the resulting alkylated phenol.

3. A process in accordance with claim 1 wherein said selective solvent is nitromethane.

4. A process in accordance with claim 1 wherein said selective solvent is a liquid phase relatively high boiling alkylated phenol fraction recovered from said alkylated phenol product and wherein said reaction admixture is in the vapor phase.

5. A process in accordance with claim 1 wherein said olefin is a mixture of olefinic polymers containing polymers having a molecular weight in the range 150–600.

6. A process in accordance with claim 1 wherein said olefin is derived from the thermal cracking of wax hydrocarbons.

7. A process in accordance with claim 1 wherein said olefin is an olefin polymer selected from the group consisting of polypropylene, polybutylene, polyisobutylene and mixtures and co-polymers thereof.

8. A process in accordance with claim 1 wherein said olefin is a polyisobutylene.

9. A process in accordance with claim 1 wherein said olefin is a polybutylene.

10. A process in accordance with claim 1 wherein said olefin is a polypropylene.

11. A method in accordance with claim 1 wherein said selective solvent comprises a low molecular weight nitroalkane.

12. A process in accordance with claim 1 wherein said selective solvent is a mixture of a nitroalkane and methanol.

13. A process for the manufacture of a relatively high molecular weight alkylated phenol which comprises subjecting a mixture containing phenol and a mixture of olefin polymers in the range $C_8$–$C_{40}$ to reaction to form a reaction admixture containing resulting alkylated phenol and unreacted olefin polymers having a boiling point similar to the boiling point of said alkylated phenol, contacting said mixture with a selective solvent for said alkylated phenol selected from the group consisting of a nitroalkane, a mixture of a nitroalkane and a low molecular weight alcohol and a high boiling alkylated phenol fraction recovered from the alkylated phenol product mentioned below to form an extract phase containing said alkylated phenol dissolved in said selective solvent, recovering said extract phase and removing said selective solvent from said extract phase to produce an alkylated phenol product having an increased proportion of alkylated phenol with respect to said reaction admixture.

14. A process in accordance with claim 13 wherein said selective solvent is a high boiling alkylated phenol fraction and wherein said reaction admixture is contacted in the vapor phase with liquid selective solvent.

15. A process in accordance with claim 13 wherein said selective solvent comprises nitroethane.

16. A process in accordance with claim 13 wherein said selective solvent comprises a 50–50 mixture of nitromethane and nitroethane.

References Cited in the file of this patent

UNITED STATES PATENTS

| | | |
|---|---|---|
| 1,922,153 | Christiansen et al. | Aug. 15, 1933 |
| 1,948,287 | Buc et al. | Feb. 20, 1934 |
| 2,022,256 | Schuler | Nov. 26, 1935 |
| 2,134,547 | Buc | Oct. 25, 1938 |
| 2,493,781 | Schneider et al. | Jan. 10, 1950 |
| 2,560,666 | Stevens et al. | July 17, 1951 |
| 2,655,544 | McNulty et al. | Oct. 13, 1953 |
| 2,671,117 | Kluge et al. | Mar. 2, 1954 |